United States Patent
Kursun et al.

(10) Patent No.: US 10,776,462 B2
(45) Date of Patent: Sep. 15, 2020

(54) DYNAMIC HIERARCHICAL LEARNING ENGINE MATRIX

(71) Applicant: BANK OF AMERICA CORPORATION, Charlotte, NC (US)

(72) Inventors: Eren Kursun, New York, NY (US); Dharmender Kumar Satija, Rye Brook, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 281 days.

(21) Appl. No.: 15/909,309

(22) Filed: Mar. 1, 2018

(65) Prior Publication Data

US 2019/0272360 A1 Sep. 5, 2019

(51) Int. Cl.
| | |
|---|---|
| G06F 21/31 | (2013.01) |
| H04L 29/08 | (2006.01) |
| G06F 21/45 | (2013.01) |
| G06N 20/00 | (2019.01) |

(52) U.S. Cl.
CPC ............ *G06F 21/316* (2013.01); *G06F 21/45* (2013.01); *H04L 67/306* (2013.01); *G06N 20/00* (2019.01)

(58) Field of Classification Search
CPC ....... G06F 21/316; G06F 21/45; H04L 67/306
See application file for complete search history.

(56) References Cited

U.S. PATENT DOCUMENTS

| | | | |
|---|---|---|---|
| 5,224,173 A | 6/1993 | Kuhns et al. | |
| 5,276,772 A | 1/1994 | Wang et al. | |
| 5,325,466 A | 6/1994 | Kornacker | |
| 5,359,699 A | 10/1994 | Tong et al. | |
| 5,577,169 A | 11/1996 | Prezioso | |
| 5,819,226 A | 10/1998 | Gopinathan et al. | |
| 5,822,741 A | 10/1998 | Fischthal | |
| 6,330,546 B1 | 12/2001 | Gopinathan et al. | |
| 7,815,106 B1 * | 10/2010 | McConnell | G06Q 30/02 235/376 |
| 8,245,282 B1 | 8/2012 | Buckwalter et al. | |
| 9,098,852 B1 | 8/2015 | Dangott et al. | |
| 9,185,095 B1 * | 11/2015 | Moritz | H04L 63/102 |
| 9,516,053 B1 * | 12/2016 | Muddu | H04L 63/1408 |
| 9,727,723 B1 * | 8/2017 | Kondaveeti | G06F 21/50 |
| 10,460,320 B1 * | 10/2019 | Cao | G06Q 20/4016 |
| 2002/0133721 A1 * | 9/2002 | Adjaoute | G06Q 20/04 726/23 |
| 2002/0161711 A1 | 10/2002 | Sartor et al. | |

(Continued)

*Primary Examiner* — Jason Chiang
(74) *Attorney, Agent, or Firm* — Michael A. Springs; Moore & Van Allen PLLC; Nicholas C. Russell

(57) ABSTRACT

Embodiments of the invention are directed to systems, methods, and computer program products for identification of normal state authenticity indicators for user and entity authentication into applications in real-time to prevent misappropriation at the point of authenticity. In this way, the system uses multiple modeling processes for identification of authentic access requests to prevent misappropriation including utilizing phase-based characterization of different perspectives to make real-time determinations on authenticity of an interaction and/or misappropriation likelihood. The invention relies on multiple characteristics and models in simultaneous utilization for real-time authenticity decisions.

23 Claims, 10 Drawing Sheets

(56) References Cited

U.S. PATENT DOCUMENTS

| | | | |
|---|---|---|---|
| 2007/0106582 A1* | 5/2007 | Baker | G06Q 10/067 |
| | | | 705/35 |
| 2007/0121596 A1 | 5/2007 | Kurapati et al. | |
| 2007/0124256 A1 | 5/2007 | Crooks et al. | |
| 2008/0059474 A1* | 3/2008 | Lim | G06F 21/604 |
| 2010/0094767 A1* | 4/2010 | Miltonberger | G06Q 10/067 |
| | | | 705/325 |
| 2010/0235908 A1 | 9/2010 | Eynon et al. | |
| 2011/0055078 A1 | 3/2011 | Nandy | |
| 2014/0058763 A1* | 2/2014 | Zizzamia | G06Q 40/08 |
| | | | 705/4 |
| 2014/0122325 A1 | 5/2014 | Zoldi et al. | |
| 2014/0215612 A1* | 7/2014 | Niccolini | H04L 63/1416 |
| | | | 726/22 |
| 2014/0289867 A1 | 9/2014 | Bukai | |
| 2015/0142595 A1* | 5/2015 | Acuna-Rohter | G06Q 30/0185 |
| | | | 705/21 |
| 2015/0186901 A1 | 7/2015 | Miltonberger | |
| 2015/0363783 A1 | 12/2015 | Ronca et al. | |
| 2016/0147583 A1* | 5/2016 | Ben Simhon | G06F 11/076 |
| | | | 714/47.3 |
| 2017/0134412 A1* | 5/2017 | Cheng | H04L 63/1425 |
| 2017/0140141 A1* | 5/2017 | Yan | G06F 21/316 |
| 2017/0148024 A1 | 5/2017 | Yu et al. | |
| 2017/0148027 A1 | 5/2017 | Yu et al. | |
| 2017/0230418 A1* | 8/2017 | Amar | H04L 67/22 |
| 2018/0033010 A1* | 2/2018 | Ustinov | G06N 7/005 |
| 2018/0191759 A1* | 7/2018 | Baijal | H04L 63/102 |
| 2018/0248904 A1* | 8/2018 | Villella | G06F 15/76 |

\* cited by examiner

DYNAMIC HIERARCHICAL LEARNING ENGINE MATRIX

BACKGROUND

Determination of authenticity of individuals for security applications is currently a post distribution determination of authenticity that rely on artificial intelligence and machine learning algorithms. However, variations in user event history makes it challenging for these approaches to accurately identify users for these applications. Accordingly, there is a need for a way to efficiently and effectively identify authenticity of individuals or entities in real-time.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Determining the authenticity of users for application can be challenging as users have wide ranges of diversity in resource distribution patterns, health care, data points, interactions, transactions over time, and the like. The system utilizes a dynamic hierarchical learning engine matrix to identify user authenticity in real-time.

In some embodiments, the user is modeled from a range of perspectives including but not limited to behavioral, temporal and state based, intent based, event based anomaly based, group based. The models rely on different perspectives to make decision on the authenticity of the interaction and/or misappropriation likelihood/risk. The unique part of the invention is that it relies on all these characteristics and models simultaneously in making a decision.

The system utilizes hierarchical learning of data and event history modeling to identify normal user event history, habits, and the like when authentication into applications, such as resource distribution applications, health applications, personal applications, or the like. In this way, the system utilizes multiple processes for identification of normality or standards of the user for identification of authenticity of authentication, identification, or access to secure locations or confirm resource distributions in real-time to prevent misappropriation.

Embodiments of the invention relate to systems, methods, and computer program products for real-time authenticity identification of a user, the invention comprising: generating one or more authenticity identification procedures, wherein the authenticity identification procedures comprise modeling characterization for generation of user profiles for misappropriation; identifying an authenticity request as being initiated, wherein the authenticity request is for authentication, identification, or access to a secure application; streaming data from the authenticity request through the one or more authenticity identification modeling for authenticity identification; and determining outcome of the authenticity request based on authenticity identification modeling outcome.

In some embodiments, the invention comprises generating event-driven modeling for authenticity identification modeling of the data stream from the authenticity requests, wherein event-driven modeling generates specific patterns in interactions based on the user profiles and misappropriation profiles for events, wherein the specific patterns are learned logical time sequence interactions identified for the event.

In some embodiments, the invention comprises generating intent-driven modeling for authenticity identification modeling of the data stream from the authenticity requests, wherein intent-driven modeling generates a dual path analysis for predicted patterning for normal authenticity requests and normal misappropriation authenticity requests, wherein a sequence of user interactions are matched to patterns of the normal authenticity requests and normal misappropriation authenticity requests to identify a sequence patterns for intent based explanations of the authenticity request.

In some embodiments, the invention comprises generating temporal based modeling for authenticity identification modeling of the data stream from the authenticity requests, wherein temporal based modeling generates a timed pattern identification of behavior of the user.

In some embodiments, the invention comprises generating a hybrid based authenticity identification utilizing a hybrid combination of temporal based modeling, event based modeling, intent based modeling, and personality based modeling for authenticity identification of the user.

In some embodiments, the user profile comprises user event history phased into temporal regions, wherein the temporal regions are identified based on pattern recognition of user event history and generate node sequences of the user with associated probabilities of connections between phase changes, wherein the nodes are connected via edges.

In some embodiments, the invention comprising optimizing the user profiles, the misappropriation profiles, and authenticity models into dynamically positioned nodes within a hierarchy that are assigned, swapped, merged, separated, consolidated, or moved within the hierarchy by the controller in real-time for authenticity identification of the user, wherein the optimizing is a self-organizing hierarchical architecture.

In some embodiments, modeling characterization further comprises: identifying patterns with respect to user event history, wherein a pattern comprises a merchant, geographic location, and trend in user events within a timeframe; identifying one or more transitions between the user patterns; and clustering the patterns into nodes with transitional edge segments comprising one or more transitions between the nodes.

In some embodiments, the invention further comprising a hierarchical learning profile optimization comprising: identifying user clusters based on user declaration or system analytics and generate a hierarchical learning profile optimization for the user; identifying the authenticity request being initiated as an anomaly for the user; reviewing the user hierarchical clusters to compare anomaly for user to individuals within the clusters; and identifying a degree of separation of cluster members with anomaly as normal resource distribution pattern.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
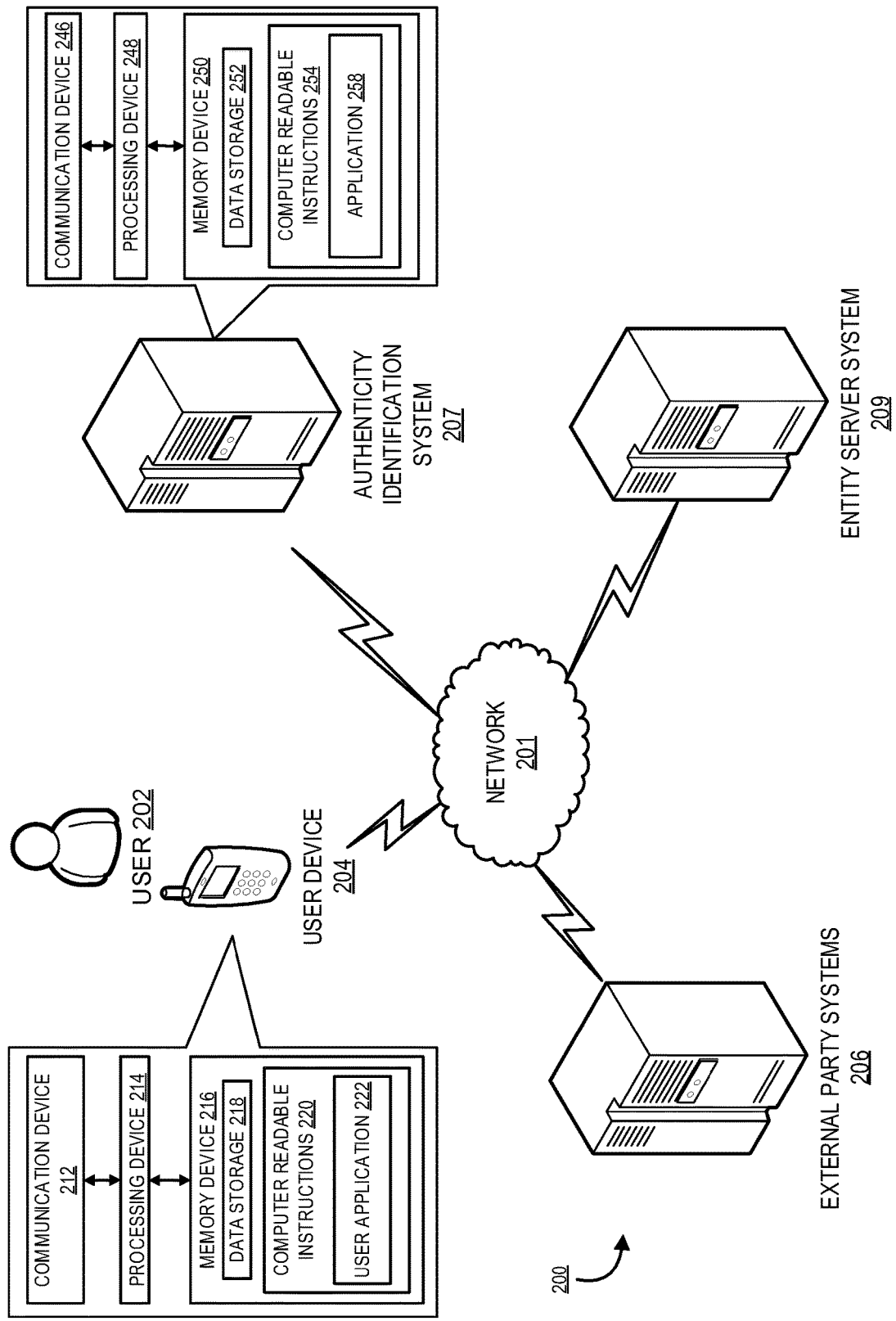
Figure 2:
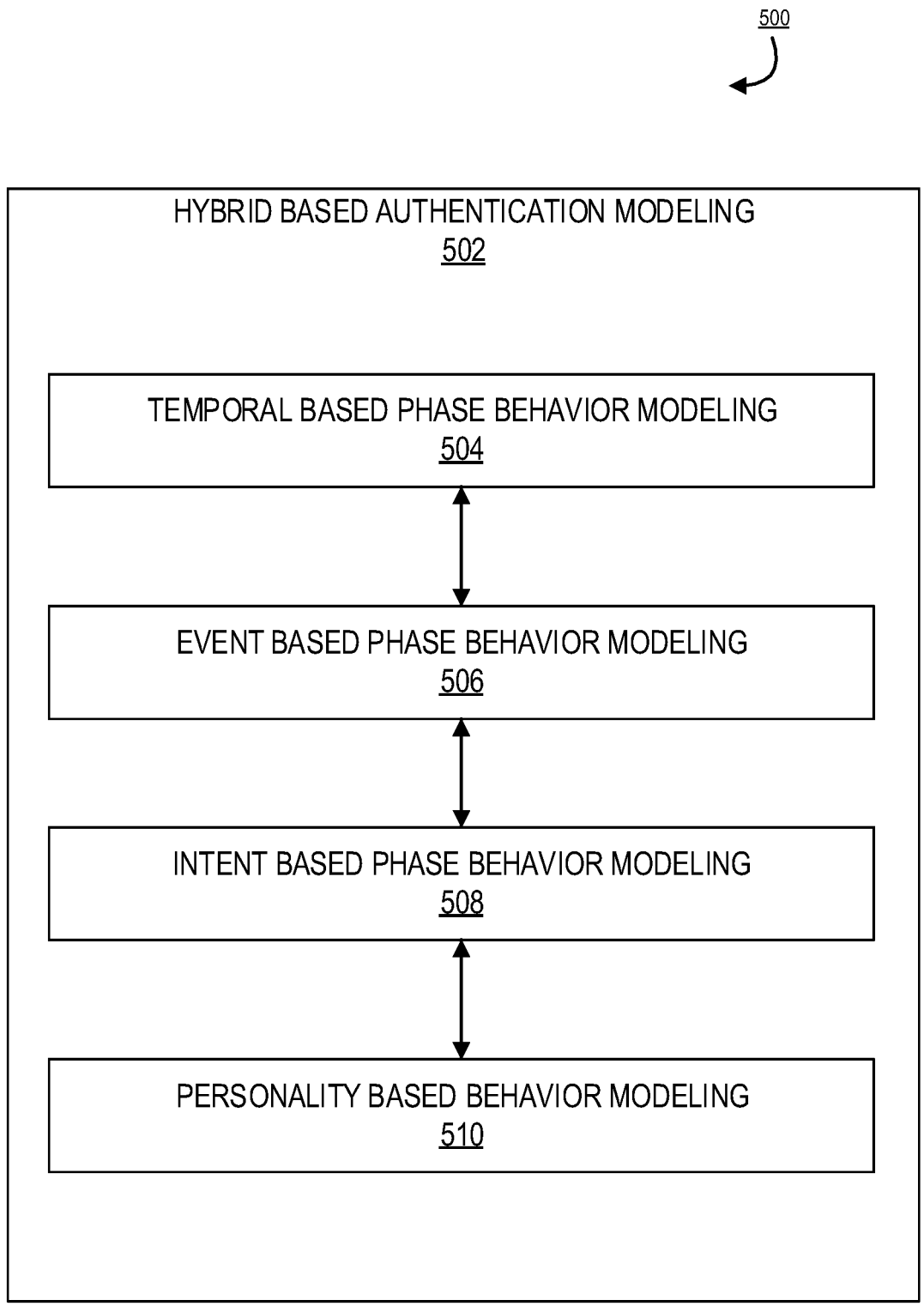
Figure 3:
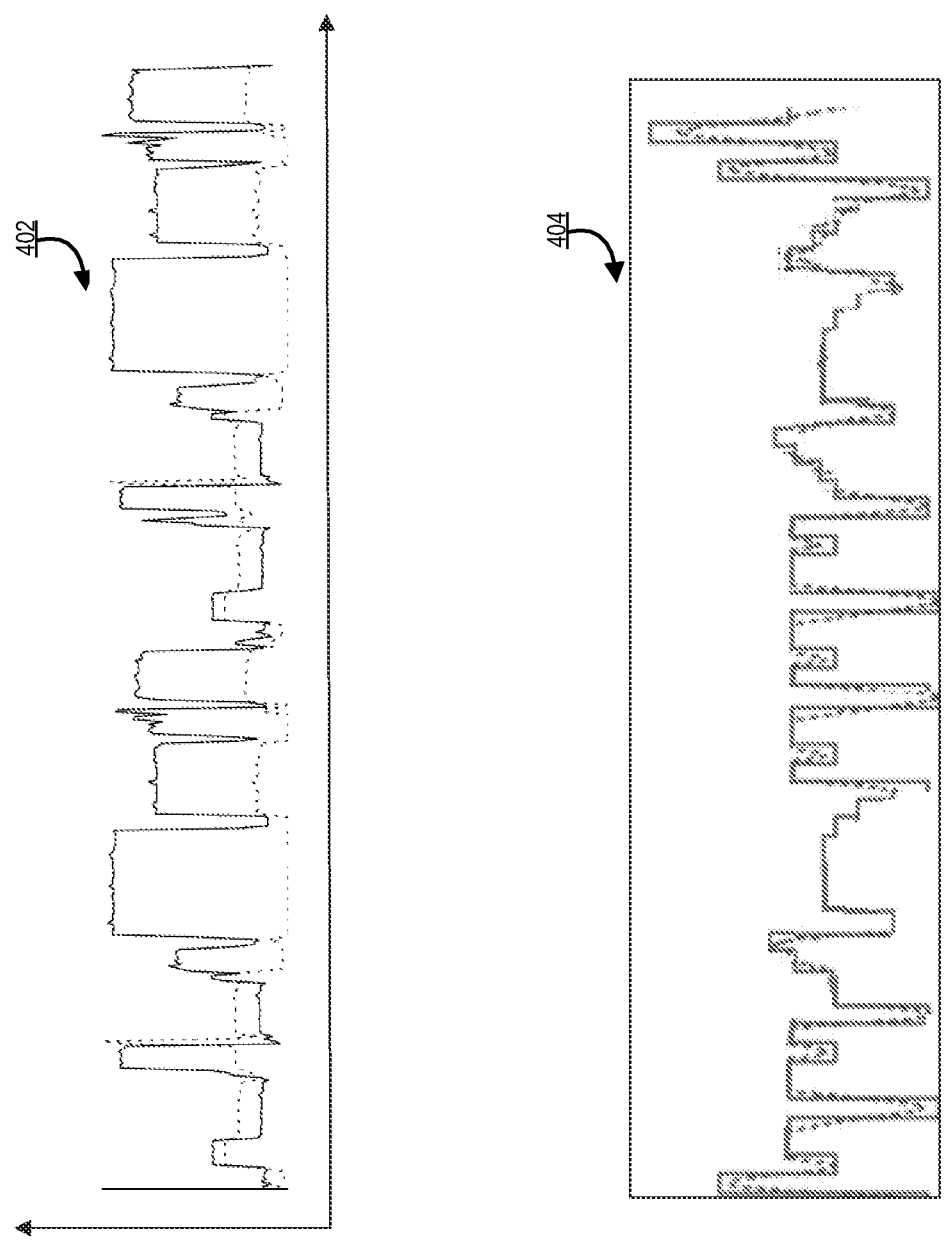
Figure 4:
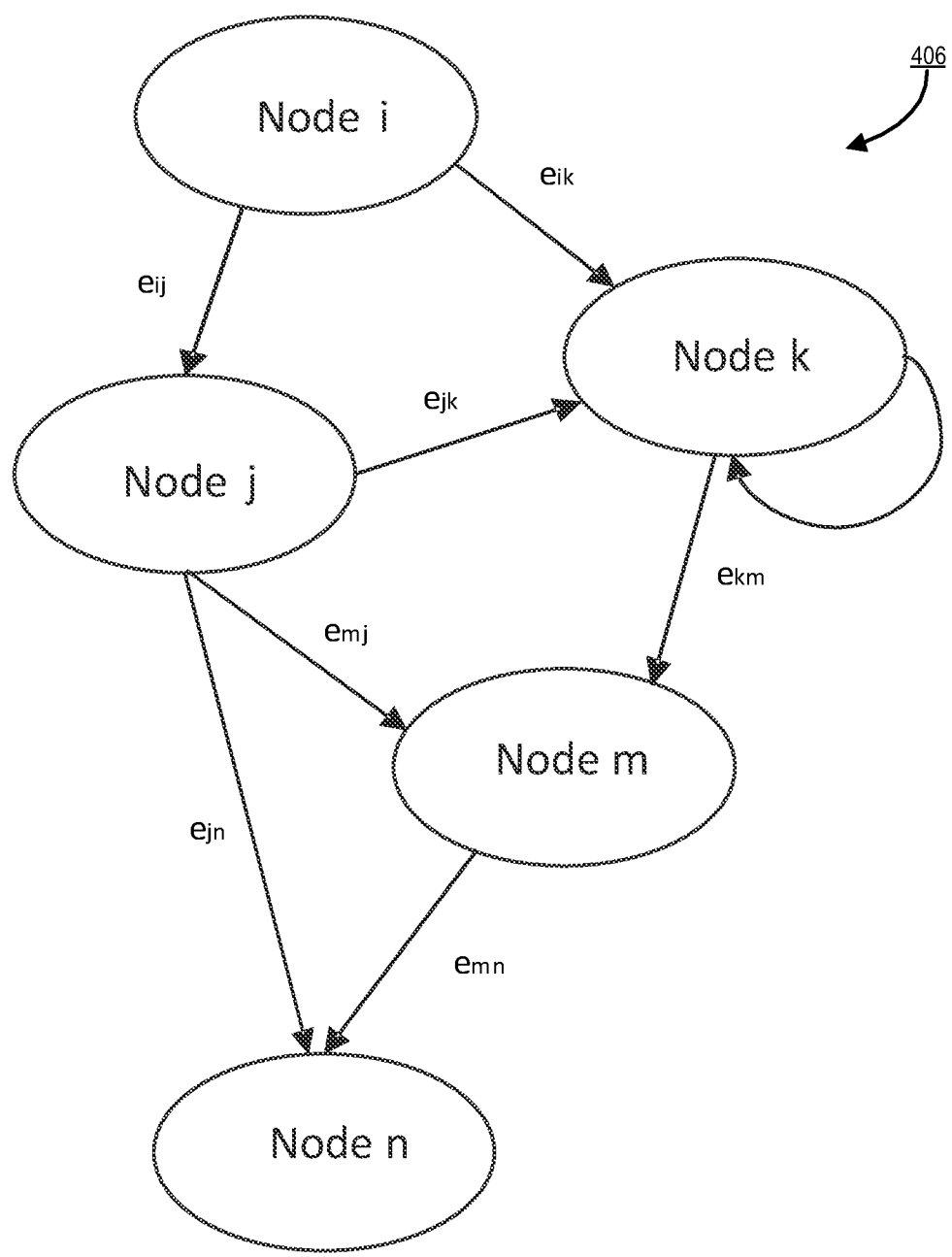
Figure 5:
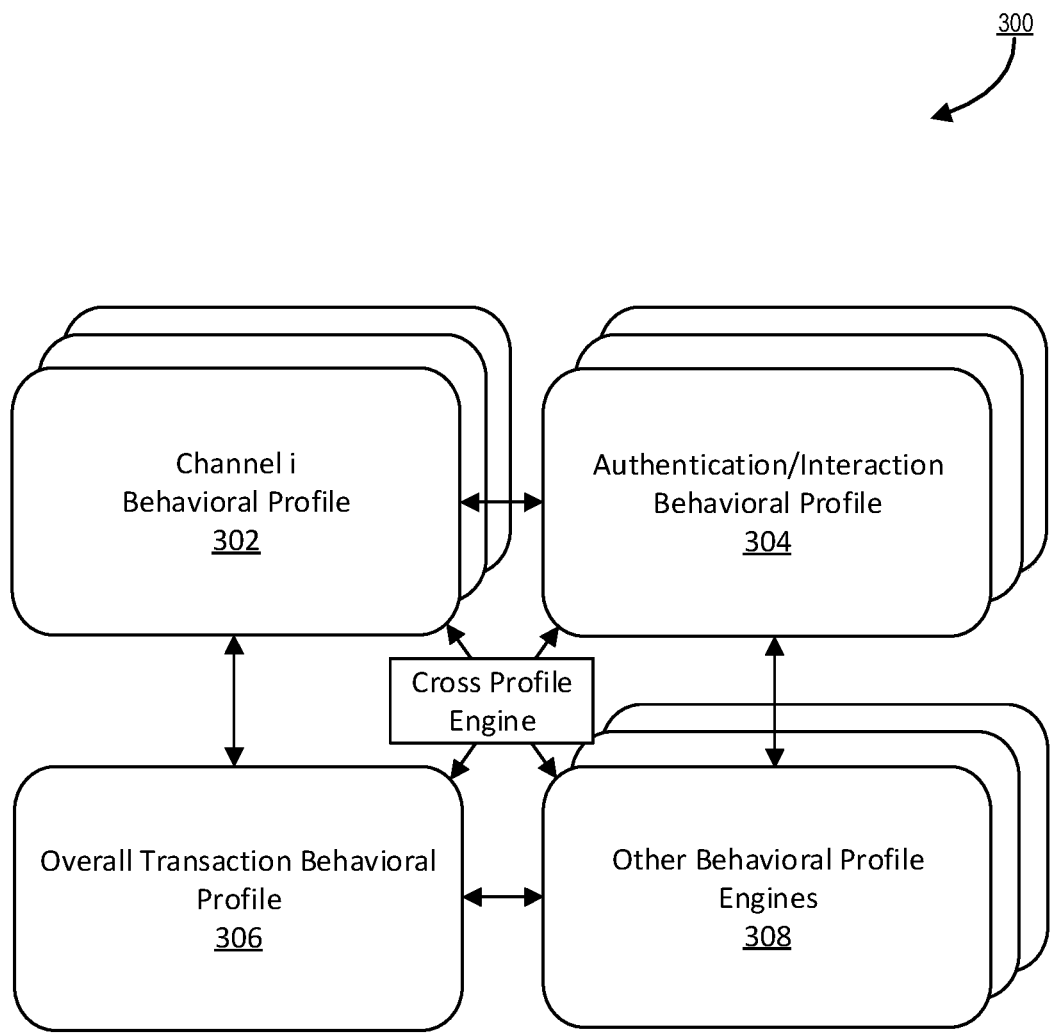
Figure 6:
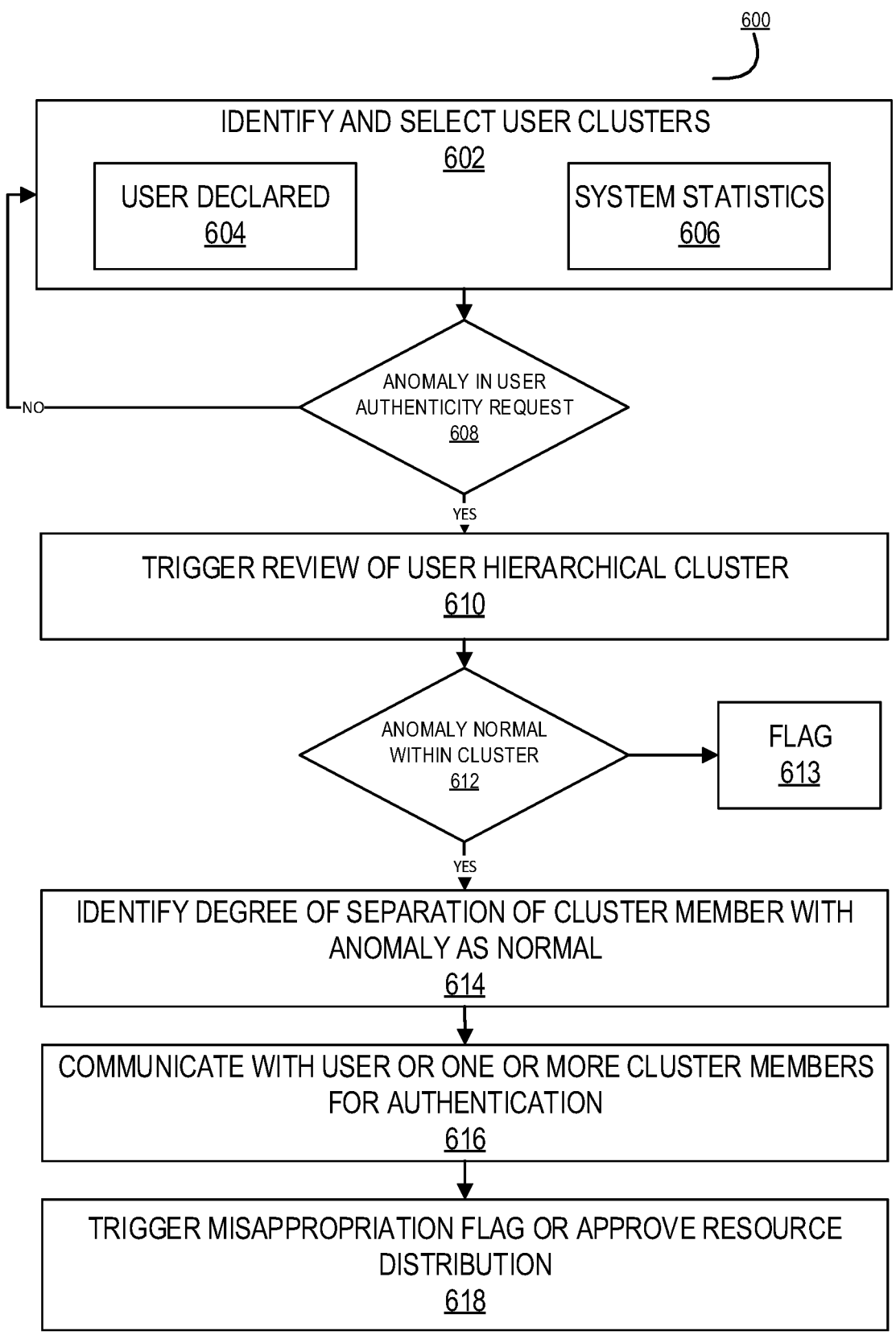
Figure 7:
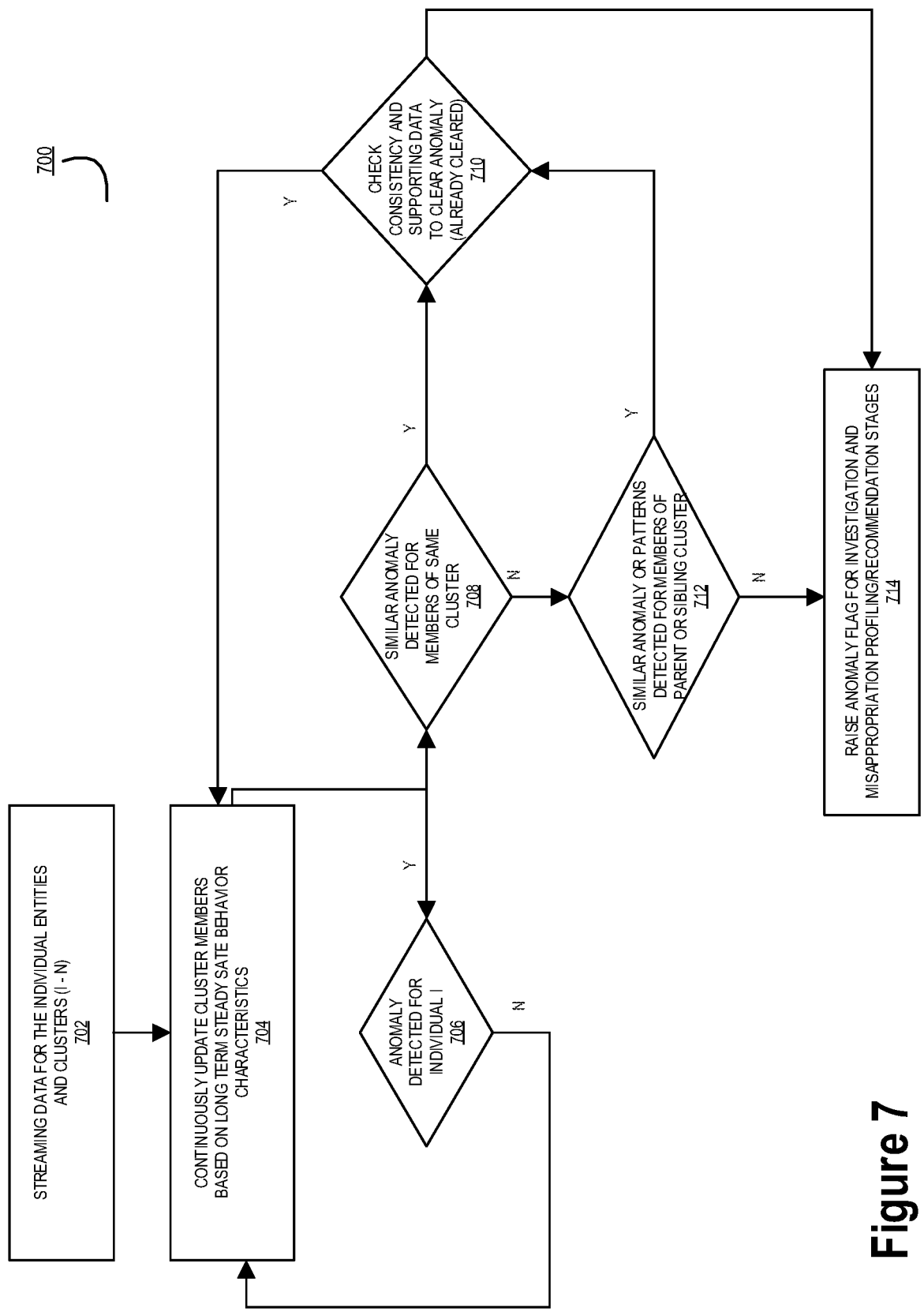
Figure 8:
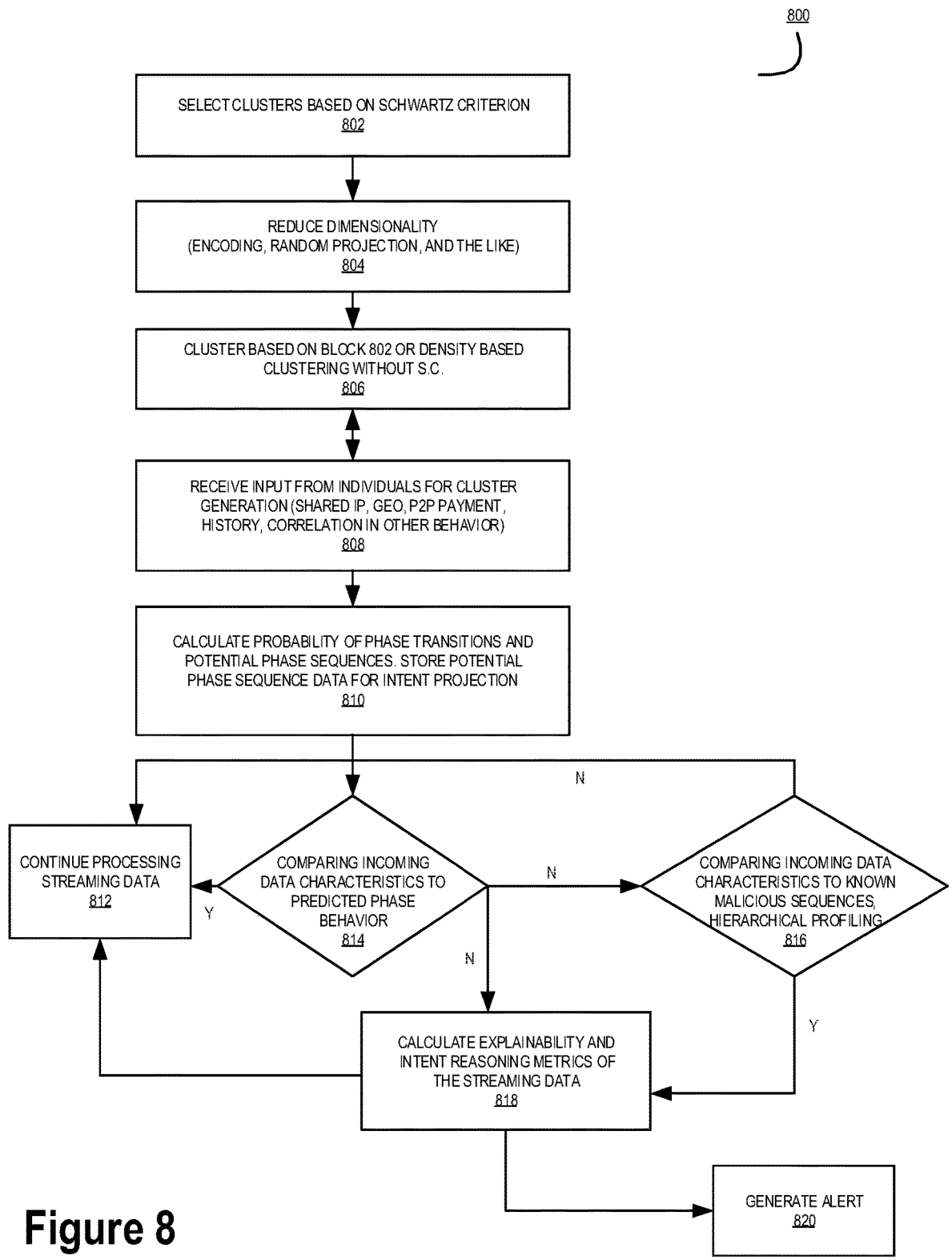
Figure 9:
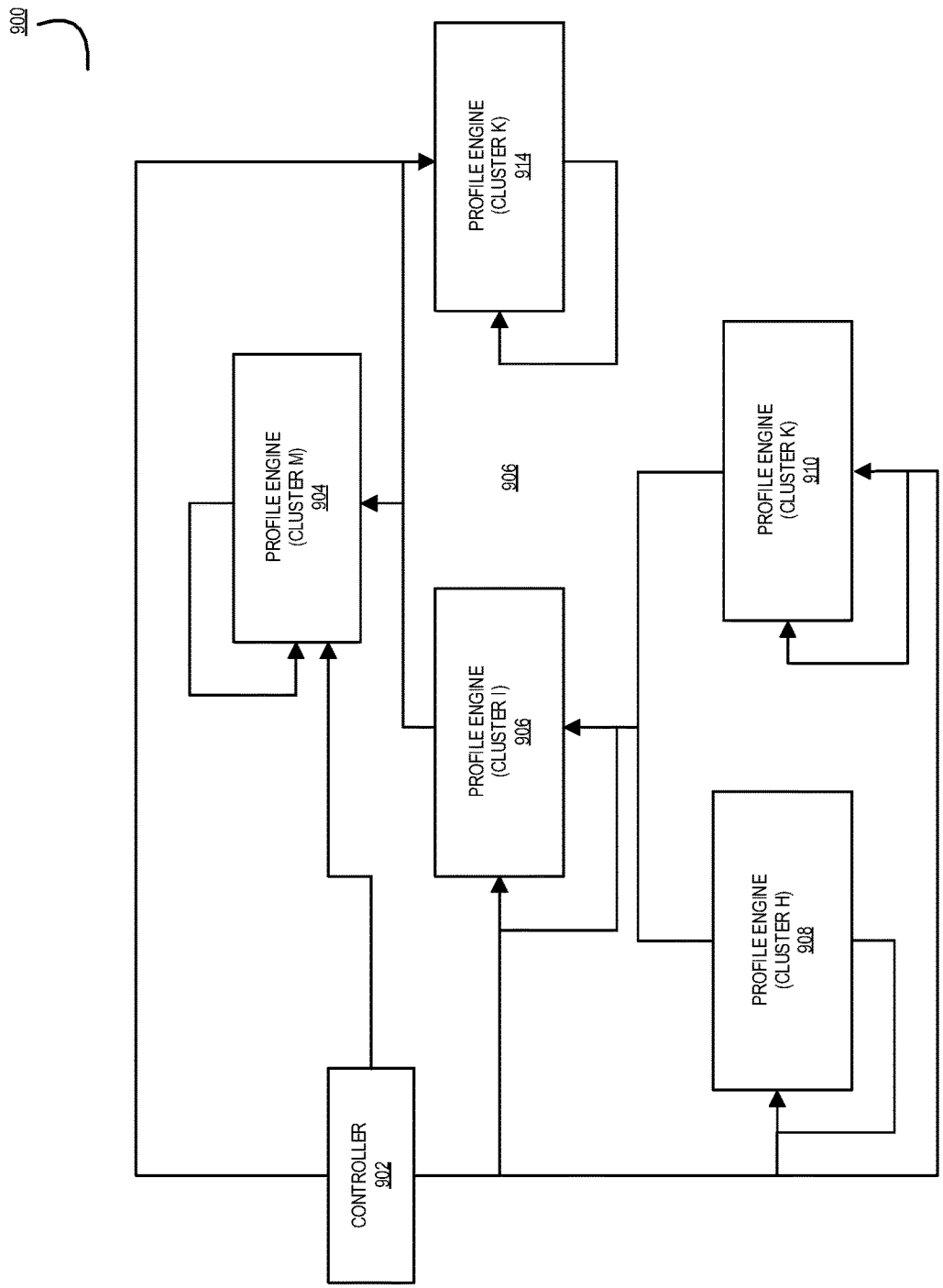
Figure 10:
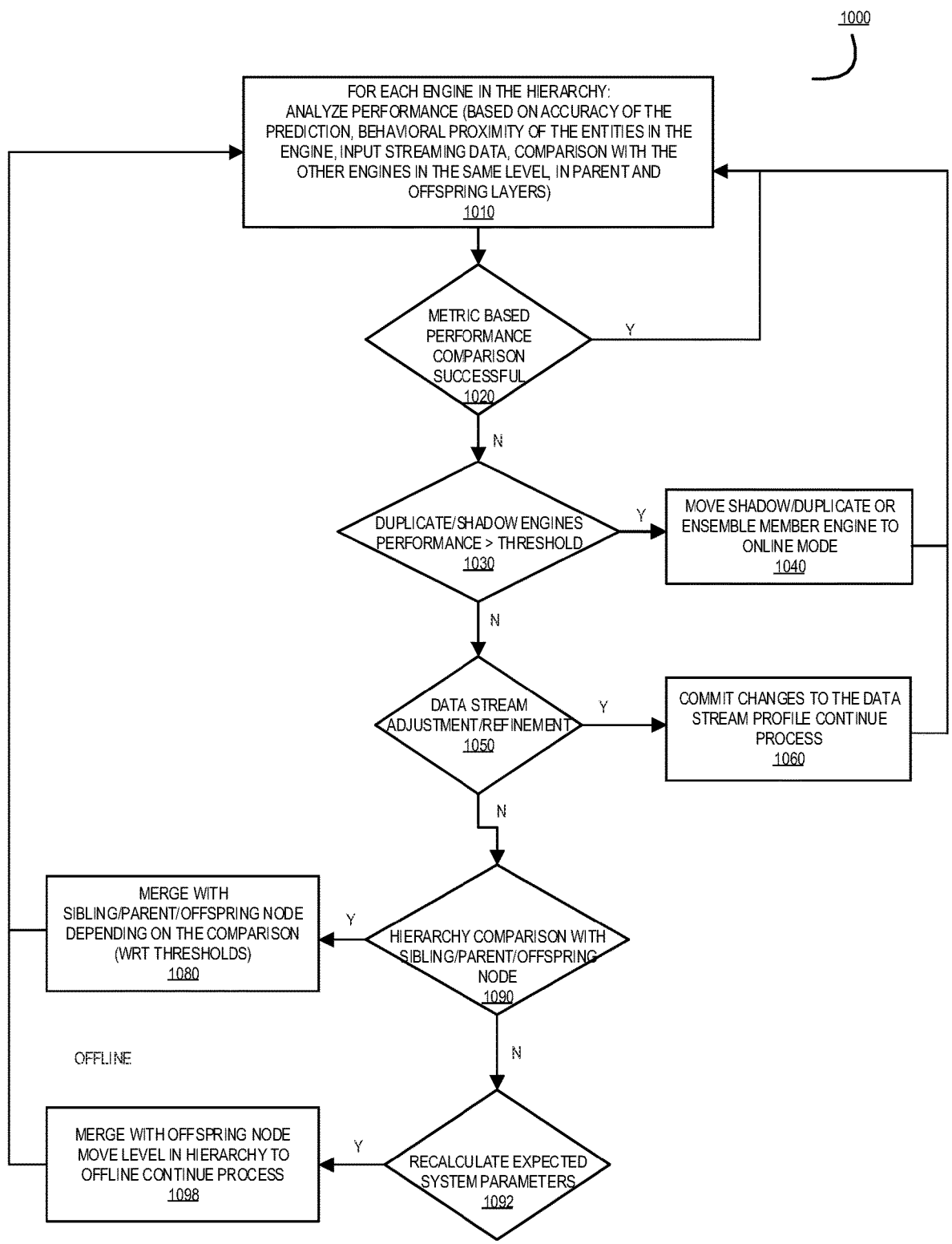

Having thus described embodiments of the invention in general terms, reference will now be made to the accompanying drawings, where:

FIG. 1 illustrates a dynamic hierarchical learning engine matrix for authenticity identification system environment, in accordance with embodiments of the present invention;

FIG. 2 illustrates a hybrid approach for authentication identification using modeled, in accordance with embodiments of the present invention;

FIG. 3 illustrates a graph of interaction patterning, in accordance with embodiments of the present invention;

FIG. 4 illustrates a flowchart for interaction phase clustering, in accordance with embodiments of the present invention;

FIG. 5 illustrates a flowchart for collective behavior characterization across channels, transactions, and entities, in accordance with embodiments of the present invention;

FIG. 6 illustrates a flowchart for hierarchical learning profile optimization for anomaly detection, in accordance with embodiments of the present invention;

FIG. 7 illustrates detailed flowchart of characterization of clusters for anomaly detection, in accordance with embodiments of the present invention;

FIG. 8 illustrates detailed flowchart of characterization of clusters for anomaly detection, in accordance with embodiments of the present invention;

FIG. 9 illustrates detailed flowchart for hierarchical behavior characterization through automated control, in accordance with embodiments of the present invention; and FIG. 10 illustrates a high level overview of hierarchical profile adjustments, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" may be a financial institution, business, insurance provider, health care provider, education institution, or the like that may include requiring identification of individuals for services/processes within the entity. Furthermore, an entity may include a merchant device, automated teller machine (ATM), entity device, or the like. For the purposes of this invention, a "communication" or a "user communication" may be any digital or electronic transmission of data, metadata, files, or the like. The communication may be originated by an individual, application, system within an entity. Furthermore, an "external party" may be one or more individuals, entities, systems, servers, or the like external to the entity. This may include third parties, partners, subsidiaries, or the like of the entity. A resource distribution, as used herein may be any transaction, property transfer, service transfer, payment, or another distributions from the user. A resource distribution may further include user authentications, locations, device usages, and the like. In some embodiments, event history may include historic resource distributions, user interactions, events the user, habits for the user, or the like.

In some embodiments, the invention models the user from a range of perspectives including but not limited to behavioral, temporal and state based, intent based, event based anomaly based, group based. The models rely on different perspectives to make decision on the authenticity of the interaction and/or misappropriation likelihood/risk. The unique part of the invention is that it relies on all these characteristics and models simultaneously in making a decision.

FIG. 1 illustrates a dynamic hierarchical learning engine matrix for authenticity identification system environment 200, in accordance with embodiments of the present invention. FIG. 1 provides the system environment 200 for which the distributive network system with specialized data feeds for extract information for information security vulnerability assessments for the user. FIG. 1 provides a unique system that includes specialized servers and system communicably linked across a distributive network of nodes required to perform the functions for authenticity identification.

As illustrated in FIG. 1, the authenticity identification system 207 is operatively coupled, via a network 201 to the user device 204, the entity server system 209, and to the external party systems 206. In this way, the authenticity identification system 207 can send information to and receive information from the user device 204, entity server system 209, and the external party systems 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is one or more individuals or entities. In this way, the user 202 may be any individual or entity requesting access to one or more locations within an application, entity, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the external party systems 206, entity server system 209, and the authenticity identification system 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222.

As further illustrated in FIG. 1, the authenticity identification system 207 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the external party systems 206, entity server system 209, and the user device 204. As such, the communication device 246 generally comprises a modem, server, or other device for communicating with other devices on the network 201.

As further illustrated in FIG. 1, the authenticity identification system 207 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the authenticity identification system 207 the memory device 250 stores an application 258. Furthermore, the authenticity identification system 207, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more of the entity server system 209 and/or user device 204.

In some embodiments, the user 202 may be utilizing the user device 204 to generate a communication. The communication may be a digital or electronic communication such as email, text message, or the like. The communication may further include information such as data, files, metadata, or the like associated with the user or the entity. The communication may be initiated by the user 202 with the desired receiver of the communication being an individual outside the entity and associated with an external party system 206. Upon generation of the communication, the user may attempt to send the communication with the information to the external party. The authenticity identification system 207 recognizes the generation of the communication and performs a vulnerability assessment of the communication to approve the communication for a permit to send. The vulnerability assessment may be an evaluation process that is built into the entity server system 209 that evaluates the security of the data in the communication prior to being transmitted.

The authenticity identification system 207 may operate to perform the authenticity identification processes. In some embodiments, the authenticity identification system 207 may perform hierarchical learning of data and event history modeling to identify normal resource distribution of a user, interactions, events, habits, or the like. In this way, in some embodiments, the authenticity identification system 207 may perform phase-based characterization of interactions and resource distribution for authenticity identification. In some embodiments, the authenticity identification system 207 may perform collective characterization across channels for authenticity identification. In some embodiments, the authenticity identification system 207 may perform learning engine cross training for authenticity identification. In some embodiments, the authenticity identification system 207 may perform hierarchical learning profile optimization for authenticity identification. In some embodiments, the authenticity identification system 207 may perform one or more of these functions to perform authenticity identification using dynamic hierarchical learning.

As illustrated in FIG. 1, the entity server system 209 is connected to the authenticity identification system 207, user device 204, and external party systems 206. The entity server system 209 has the same or similar components as described above with respect to the user device 204 and authenticity identification system 207. The entity server system 209 may be the main system server for the entity housing the entity email, data, documents, and the like. The entity server system 209 may also include the servers and network mainframe required for the entity.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates the hybrid approach for authentication identification using modeled 500 from a range of perspectives including but not limited to behavioral, temporal and state based, intent based, event based anomaly based, and group based. The models rely on different perspectives to make a decision on the authenticity of the interaction and/or misappropriation likelihood/risk. The unique part of the invention is that it relies on all these characteristics and models simultaneously in making a decision.

In some embodiments, user historical event history attributes are identified. These may be transaction attributes or non-transaction attributes. The event history attributes may include user's behavior, transaction history, resource distribution habits, geographic location, tendencies, passwords, and the like. The attributes are compiled for the user for authenticity identification. Upon indication of a required identification of a user for authentication, the system may trigger an authenticity identification process for confirmation in real-time for identification of normality or standard event history patterning of the user for identification of authenticity of authentication, identification, or access to secure locations or confirm resource distributions in real-time to prevent misappropriation.

Using the one or more authenticity identification procedures, the system may confirm authorization of the user. As such, the system may determine if the authentication, identification, or access to a secure location should be granted to the individual or entity requesting access. If not, the authenticity identification procedures will identify that the user did not authorize the access and deny access.

In some embodiments, the invention includes phase characterization for modeling of a user for determination of a range of perspectives for the user. In this way, the system identifies patterns in user event history that leads to identification of phases of a user life. The user patterns may change from life events, over recurring periods, geographic locations, resource distributions, and the like that make it challenging to identify normal characterization for the user due to the divergence in the patterns. However, the system may utilize the divergences to identify unique patterns and in turn phases of a user and extract those phases with a consistence and predictability. The system using phase characterization identifies patterns of a user over time. These patterns can include repetitive or non-repetitive patterns. The system performs patterning by creation of profiles for the user that identify cross-channel patterns that uniquely identify user event history. In some embodiments, the system utilizes Bayesian belief networks, time series analysis, learning engines, and the like for accuracy characterization. These patterns may include misappropriation aversion, interaction patterns during the day, budget consciousness, resource distribution patterns, overall divergence, resource distribution, geographic behavior, and predictability patterning of historic user actions. The patterns are then clustered together into phases of a user.

As illustrated in block 504, one of the hybrid based authentication modeling 502 includes temporal based phase behavior. These temporal based phase behaviors identify patterns within a user or entity such as weekend vs. weekday patterning and an overarching patterning of the time based behavior of a user or entity.

As illustrated in block 506, one of the hybrid based authentication modeling 502 includes event based phase behavior. Based on an event, the system identifies or expects specific behavior and models it as such. For example, if the system identifies a purchase of an airline ticket, the system via event based phase behavior modeling identifies or expects other potential authentications such as meals, hotel, transportation, and the like.

As illustrated in block 508, one of the hybrid based authentication modeling 502 includes intent based phase behavior modeling. Intent based phase behavior determines if one or more transactions would occur under the same circumstances. The system identifies potential adversarial intent, identifying if a transaction may have occurred or would have likely occurred in a normal phase or if the circumstances of the transaction have more of an adversarial intent.

As illustrated in block 510, one of the hybrid based authentication modeling 502 includes personality based phase behavior modeling. Personality based phase behavior modeling includes personal user or entity habits. For example, if a user never uses a mobile payment method for a transaction, the system may flag a mobile transaction performed as potentially not being authenticated by the user based on the user's personality based behavior modeling.

This modeling may model individuals, entities, devices, programs, merchants, or the like. These one or more of these various phases may be combined to generate the user profile. In some embodiments, the phases may be weighted, non-weighted, or the like to generate a holistic view of the user or entity.

In some embodiments, the modeling further includes profile clustering for anomaly detection. In this way, the system optimization clusters closely related accounts from one or more related users, such as friends, family members, or the like to identify abnormal resource distributions for a user that may potentially be normal for one or more other individuals within the cluster.

In this way, the system identifies patterns and extracts those patterns during a user event history patterns to identify phases of a user life. The user may change from life events, over recurring periods, geographic locations, and the like that make it challenging to identify normal event characterization for the user due to the divergence in the patterns. However, the system may utilize the divergences to identify unique phases of a user and extract those phases with a consistence and predictability. The system may identify user interactions. These interactions may be historic interactions that include prior resource distributions, geolocations, behavior characteristics, habits, and the like that make up user event history. The system may utilize the data to identify patterns over time for the user. In this way, the system collects data over time and tracks patterns in user event history over that time as further illustrated in FIG. 3.

FIG. 3 illustrates a graph of user interaction patterning 402 and 404, in accordance with embodiments of the present invention. In this way, the graph illustrated variability and phases in resource distribution, non-resource related transactions, events, and other interactions of the user. As illustrated in section 402 the behavior of the user is charted based on user interactions. In some embodiments, the system may utilize the Schwartz criterion for cluster selection followed by K-means. The system reduces the dimensionality of the data using auto-encoders. The system performs density based clustering to determine the patterns of the user.

In some embodiments, the system generates event-driven characterization for identification of patterns. In some embodiments, the system generates intent-based characterization for identification of patterns. These are utilized for phase transitions or transaction transition tracking within the phase characterization. With respect to event-driven characterization, the system performs machine learning algorithms for assessment of the data stream through event driven perspectives. In this way, specific life events of a user are identified and the data stream is evaluated based on those events. This evaluation includes logical time sequences of events, time of the events, location of the events, reasonableness of the event occurring, and the like are utilized for the overall pattern. For example a resource distribution at a local merchant is identified followed by an authentication request in a distant location may be flags as potential misappropriation based on event-driven characterization indication that the time between geographic locations are unreasonable.

In other embodiments, the system generates an intent-driven characterization for identification of patterns. Intent-based characterization for identification of patterns comprise a dual path of analysis conducted for normal predicted user patterning and for adversarial intent based patterning. In some embodiments, normal predicted user patterning includes an analysis of user resource distributions and habits that follow a normal predicted pattern. For example, the system may identify a plane ticket purchase followed by transportation, hotel, and meal purchases. This sequence of transactions may match either the user or general event history patterns for individuals. In some embodiments, the system may maintain and store a library of phase transitions and sequence patterns for intent based explanations, such as travel patterns, sequences of resource distributions, and the like.

In some embodiments, adversarial intent based patterning includes an analysis of user resource distributions and habits that follow a normal predicted pattern of misappropriation.

In this way, the system may include a library of patterns of user event history for identified misappropriation based on various channels.

In graph 404 of FIG. 3, the phases of the user are identified as unique temporal regions of user event history. In this way, the system captures one or more elements that may be utilized as building blocks for an overall temporal region identification of user history modeling. The phases identified within the patterns can be non-intuitive based on underlying patterns, by time frames (day/night), geographical location (home, work, travel), weekend/weekday, or the like. After the natural states are identified the phase sequences are identified with associated probabilities between the phase changes.

In some embodiments, a controller engine associated with the system is utilized to perform the modeling and reasoning based on the event based, intent based, behavioral modeling, and anomaly based modeling. This is performed via a learning controller.

Once the patterns are identified over time, the process continues by identifying transitions within the user patterns. Once the patterns are identified, the system further clusters the patterns into phases with transitional segments between the phases. The phases may include a phase of the user's life that identifies specific time frame, geographic location, event, or the like and identify a specific phase of the user's lifetime. Phase clustering is further outlined in FIG. 4.

FIG. 4 illustrates a flowchart for resource distribution phase clustering 406, in accordance with embodiments of the present invention. The system may utilize phase clustering of the patterns into user life phases. These nodes are linked with transition periods such that if behavior of linked phases are identified next to each other in time, the system may authenticate the resource distribution. However, if two resource distributions that are in not linked phases occur at or near the same time, the system may identify one of those distributions as potentially misappropriated. As illustrated in FIG. 3, the system has mapped 5 nodes for this particular user illustrating different phases or nodes of the user, Node i, Node j, Node k, Node m, and Node n. These phases may constitute a geographical location of the user, user devices, resource distribution habits, IP addresses, authentication patterns, event history of the user, clickstreams of the user, and the like. As illustrated Node i is linked to Node j via edge eij and Node i is linked to Node k via edge eik. In this way, the phases have specific edges that tie the specific nodes to different probabilities between the phases that predict the state transition. As such, when an authenticity request is generated and is identified as matching to Node i and another, at or near the same time, is identified in Node j, those two authenticity requests may identified as authentic based on the phases being linked. However, if one of the authenticity requests is identified and categorized into Node i and the other identified and categorized into Node n, the system identifies that one or more of the requests are misappropriated.

The phases and phase transitions are calculated using fuzzy phase classification in a streaming real-time basis as data is being collected. The calculations are performed based on historical data and are continually updated based on interactions the user is having. Metrics are extracted for each phase; these metrics are indicative of the phase environment and are used for evaluation in determination of potential misappropriation associated with the observed patterns within the phase.

In some embodiments, incoming data from a user authenticity request may not directly fit within the characteristics for the phase. If the resource distribution does not fit into a phase, the distribution is flagged as potentially misappropriated or high priority.

FIG. 5 illustrates a flowchart for collective behavior characterization across channels, transactions, and entities 300, in accordance with one embodiment of the invention. As illustrated a collection of behavioral profile engines run in parallel. In some embodiments, these may include channel i behavioral profile 302, authentication/interaction behavioral profile 304, overall transaction behavioral profile 306, and other behavioral profile engines 308. In collaboration with each other the profile engines profile different aspects of the streaming data as and detect anomalies. The collective behavioral characterization across channels, transactions, and entities further includes financial transactions, non-monetary transactions, authentication profiles, other profile engines such as other channels of data for an individual, a segment, a geographic location, channel, transaction type, device, or the like to detect anomalies. Furthermore, the system may include security tracking across all known channels such that the system may compare the behavioral profile against known attack, threat types, emerging patterns, geographic patterns, and the like. The system may include a separate engine that focuses on cross characterization patterns and their correlation with each other.

In some embodiments, the invention organizes multiple models for a large number of entities, segments, groups, and the like along with the methods to organize the big picture system consisting of these models. The multitude of models are interconnected through dynamically adjustable and learning structure. The models are organized in a hierarchical fashion when appropriate.

FIG. 6 illustrates a flowchart for hierarchical learning profile optimization for anomaly detection 600, in accordance with embodiments of the present invention. Hierarchical learning profile optimization clusters closely related accounts from one or more related users, such as friends, family members, or the like to identify abnormal authenticity requests for a single user that may potentially be normal for one or more other individuals within the cluster. The system correlates and analyzes closely related accounts for misappropriation detection. A collection of different profiles are grouped/clustered simultaneously, based on real-time data behavioral, logical connectivity. In some cases the user may assign itself a cluster, to be checked against a profile such as family members, spouse, friends, or the like.

The hierarchical learning profile optimization for anomaly detection includes collection of profile-based learning engines with redundancies, a profile controller that is deciding what level of hierarchy has critical predictability advantages using experimental data and policy information, and configuration infrastructure to enable the configuration of desired systems.

In some embodiments, the invention comprises a dynamic controller. The controller (or a decentralized learning system) can decide on the hierarchy, depth/breadth/type of engines, the interconnectivity among the engines, weights, or the like. The controller also decides on data flow through the system or sea of learning engines, the feedback and learning loops, or the like. It is also understood that the same processes can be done by a decentralized system, analogous to the controller (or a collection of controllers). This centralized or decentralized system also uses learning to adjust the topology. Similarly known fraud groups, emerging misappropriation patterns and the like are profiled through a similar collection of interconnected/organized sea of learning engines. The profiles/transactions are checked against these emerging patterns. (e.g. when a fraud group/activity reaches a threshold, a new model is generated for it automatically. The streaming data is then cross checked with all such models). All of the characterization and configuration activities are performed in real-time. The controller analyzes shared patterns and calculates optimal levels of hierarchy for characterization and reorganization of the cluster of groups.

As illustrated in block 602, the process 600 is initiated by identifying and selecting a user cluster. The cluster may be user determined or user declared as illustrated in block 604 or be system statistically determined as illustrated in block 606. The system determined clusters may be determined based on Schwartz criterion, density based clustering, reduced dimensionality, or the like. The user clusters may be leveled. The levels may be closely related family members as a high or near level and friends or the like on a lower or far level. These levels may provide an indication as to the level of anomaly acceptable as authentic for the user within his/her hierarchical cluster.

As illustrated in block 608, the process 600 continues by determining if there is an anomaly in the user authenticity request. In this way, the system may identify and flag a potential misappropriation of authenticity request not being authorized by the user. When the anomaly is detected an analysis of data similar to others within the hierarchical cluster is triggered, as illustrated in block 610. Furthermore, the system may contact one or more individuals within the cluster upon identification of a lost user device. In this way, the system may identify an authentication or misappropriation alter to a designated contact or family member.

As illustrated in block 612, the process 600 continues by determining if the anomalies as normal with one or more individuals within the cluster. If no anomaly is identified within the user cluster, the system flags the authenticity request, as illustrated in block 613. In some embodiments, the system may identify one or more anomalies of a user that may be normal for an individual within the cluster. The system may cross check anomalies at a transactional level, authentication level, geolocation, resource distribution level, devices, or the like.

Upon identification of the anomaly being normal for one or more individuals within the cluster of the user, the system may identify the degree of the separation of customer member with the anomaly as normal, as illustrated in block 614. In this way, depending upon the degree of relative closeness of the user to the individual within the cluster the anomaly may be flagged as approved or denied.

The system may communicate with the user or one or more cluster members for authentication of the anomaly, as illustrated in block 616. Any anomaly, explainability challenges are then checked against these collection of engines. In this way, the system may identify an authentication or misappropriation alter to a designated contact or family member. Finally, as illustrated in block 618, the process 600 is completed by triggering misappropriation flagging or approval of the resource distribution based upon the authentication.

In some embodiments real-time controlling of hierarchical learning profile optimization for anomaly detection further comprises characterization of resource distribution, user event histories, historic authenticity requests, and the like. The hierarchical learning profile optimization provides user characterization at multiple levels including individual, segment, category, group, or the like. There may be levels of hierarchical learning profile optimization the user may be linked to. However, each level in the cluster may or may not yield to accurate event history profiles of the user as the levels may evolve over time. In order to prevent this evolution, the system collects the user profiles from the learning engines with redundancies, decides a level of hierarchy with critical predictability advantages for the user using experimental data and policy information to trigger exact or critical levels of user, such as those of family members, close friends, or the like, and configures infrastructure to enable the configuration of desired systems. These all occur in real-time and removes the traditional stage of taking profile systems offline, analyzing the data, reorganization, and optimization of traditional systems, thus expediting and more accurately defining clusters.

In some embodiments, the hierarchical controller collects information from one or more profile engines. The profile engines are trained to retain real-time data regarding event history patterning of the user and are associated with one or more users. The hierarchical controller collects the information form the profile learning engines and determines a level of hierarchy for the user. In this way, the hierarchical controller analyzes shared patterns, calculates optimal levels of hierarch for the user, and reorganizes groups for generating profiles. In some embodiments, the system may swap and inter-profile optimization where individual engines in the hierarchy determine whether their profiles are accurate and saps the profile with nodes in the neighborhood determining whether to offload to others in the same hierarchy, or associated node. In this way, the system automatically tracks internal profile engine parameters. This fluid system allows for kicking off new models, generation of replicas, parent/ offspring node leveling within the hierarchy, merging of similarly leveled nodes, and the like. In this way, the system dynamically optimizes the hierarchy of the profile engines, identifies a number of users within one or more hierarchical clusters, assigns individual users to one or more clusters, and continually characterizes the individual users in real-time for modifications to levels within one or more hierarchy clusters. The user's clusters may be modified in a hierarchical fashion, such that real-time user hierarchical learning profile optimization may be updated. In this way, the clusters for the user, such as cluster level 1, level 2, level 3, and the like may be modified based on the real-time user data from the profiles engines for identification of the user's most important or closest related cluster being identified as cluster level 1.

For each engine within the hierarchy, the system may analyze the performance of that engine based on the accuracy of the engine predictions, proximity of the entities in the engine, input streaming data, comparison with other engines on the same level, and comparisons with other engines on different levels within the hierarchy. Based on the engine performance, the system may modify the engine, merge the engine with another within the hierarchy, move the engine, or maintain the engines location within the hierarchy, making the system a fluid authenticity identification network system based on user associations and hierarchical leveling.

FIG. 7 illustrates detailed flowchart of characterization of clusters for anomaly detection 700, in accordance with embodiments of the present invention. As illustrated in block 702, the process 700 is initiated by streaming data from the individual entities and clusters. In this illustration the clusters include clusters (I-N). As illustrated in block 704, the system continuously updates the cluster members based on long term steady state behavior characteristics. Next, as illustrated in block 706 if no anomaly is detected for the individual the process 700 returns to block 704. If an anomaly is detected, the process continues to determine if similar anomalies are detected for members of the same cluster, as illustrate in block 708. If similar anomalies are detected, the system may check consistence and supporting data to clear the anomaly, as illustrated in block 710. If the anomaly is cleared the process 700 refers back to block 704. If not, then the system may raise the anomaly flag for investigation and misappropriation characterization/recommendation states, as illustrated in block 714.

Referring back to block 708 if no similar anomaly is detected for members of the same cluster, the process continues by identifying if similar anomalies or patterns are detected for members of parent or sibling clusters, as illustrated in block 712. If yes, then the process 700 refers back to block 710 for checking of consistency and for supporting data to clear the anomaly. If no similar anomalies or patterns are detected for members of parent or sibling clusters in block 712, the process 700 continues again to block 714 and raises the anomaly flag for investigation and misappropriation characterization/recommendation states.

FIG. 8 illustrates detailed flowchart of characterization of clusters for anomaly detection 800, in accordance with embodiments of the present invention. As illustrated in block 802, the process 800 is initiated by selecting the clusters based on the Schwartz criterion. Next, as illustrated in block 084 the system may reduce dimensionality, such as encoding, random projection, or the like of the selected clusters. As further illustrated, the cluster selection may be based on block 802 or determined based in density based clustering without the Schwartz criterion, as illustrated in block 806.

Next, as illustrated in block 808, the process 800 continues by receiving input from individuals for cluster generation, these inputs may include shared IP addresses, geolocation, person-to-person payment history, correlation in other behaviors, or the like. The system continues by calculating probability of phase transitions and potential phase sequences and stores the potential phase sequence data for intent projections, as illustrated in block 810. Next, as illustrated in block 814, the system may compare incoming data characteristics to predicted phase behavior. If the incoming data characteristics match to the predicted phase behavior the process 800 continues by continuing to process the streaming data, as illustrated in block 812.

Referring back to block 814, if the comparison between the incoming data characteristics to the predicted phase behavior does not back, the system continues to compare the incoming data characteristics to the known malicious sequences, hierarchical characterization, as illustrated in block 816. Alternatively, the system may calculate explainability and intent reasoning metrics of the streaming data, as illustrated in block 818. If the, comparison of the incoming data characteristics to the known malicious sequences, hierarchical characterization, is a match in block 816, the system may refer to block 818 to calculate explainability and intent reasoning metrics of the streaming data. Next, as illustrated in block 820, the process 800 continues to generate an alert. If the, comparison of the incoming data characteristics to the known malicious sequences, hierarchical characterization, is not a match in block 816, the process 800 refers back to continuing processing of the streaming data in block 812.

FIG. 9 illustrates detailed flowchart for hierarchical behavior characterization through automated control 900, in accordance with embodiments of the present invention. As illustrated, the controller 902. As illustrated, the controller 902 may communicate with the profile engines performing various tasks. As illustrated multiple profile engines are illustrated, including a profile engine for cluster M, as illustrated in block 904, a profile engine for cluster I, as illustrated in block 906, a profile engine for cluster K, as illustrated in block 914, a profile engine for cluster H, as illustrated in block 908, and a profile engine for cluster K, as illustrated in block 910.

FIG. 10 illustrates a high level overview of hierarchical profile adjustments 1000, in accordance with embodiments of the present invention. As illustrated in block 1010 for each engine in the hierarchy the system may analyze performance based on accuracy of the prediction, behavioral proximity of the entities in the engine, input streaming data, comparison with the other engines in the same level, comparison with the other engines in parent level, and comparison with the other engines in offspring layers.

As illustrated in block 1020 the system determines if the metric based performance comparison was successful, is so, the process returns to block 1010. If the metric based performance comparison was unsuccessful, the process 1000 continues to duplicate/shadow engine performance is greater than a predetermined threshold. If yes then the system moves the shadow/duplicate or ensemble member ensemble member engine to online mode as illustrated in block 1040 and returns to block 1010. If no, the process 1000 continues by performing data stream adjustment/refinement, as illustrated in block 1050. If the adjustment/refinement is successful, the changes are committed to the data stream profile and continued to process, as illustrated in block 1060 and returns to block 1010. If the adjustments/refinements are not successful the process 1000 continues by performing hierarchy comparison with siblings, parents, or offspring nodes, as illustrated in block 1090. If the comparison is successful, the process 1000 continues by merging the data with the siblings, parents, or offspring node depending on the comparison with respect to the threshold, as illustrated in block 1080 and returns to block 1010. If the comparison is not successful, the process 1000 continues by recalculating the expected system parameters as illustrated in block 1092 and merging the recalculated expected parameters with offspring nodes and adjusting the level in the hierarchy to offline to continue process, as illustrated in block 1098.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authentication and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for real-time authenticity identification of a user, the system comprising:
  a controller for dynamically performing modeling and reasoning for authenticity identification of the user, the controller comprising one or more memory devices with computer-readable program code stored thereon, one or more communication devices connected to a network, and one or more processing devices, wherein the one or more processing devices are configured to execute the computer-readable program code to:
    generate one or more authenticity identification procedures, wherein the authenticity identification procedures comprise modeling characterization for generation of user profiles for misappropriation, and wherein the modeling characterization comprises:
      identifying user patterns with respect to a user event history,
      identifying one or more transitions between the user patterns, and
      clustering the user patterns into nodes with transitional edge segments comprising one or more transitions connecting the nodes, wherein each node represents a user phase;
    identify an authenticity request as being initiated, wherein the authenticity request is for authentication, identification, or access to a secure application;
    stream data from the authenticity request through the modeling of the one or more authenticity identification procedures for authenticity identification, wherein streaming the data from the authenticity request through the modeling comprises:
      determining that the data from the authenticity request indicates that the authenticity request is associated with a first user phase,
      determining that a previous authenticity request is associated with a second user phase, and
      determining whether the node of the first user phase and the node of the second user phase are connected by a transitional edge segment; and
    determine an outcome of the authenticity request based on an outcome of the authenticity identification modeling, wherein the authenticity identification modeling outcome is at least partially based on whether the node of the first user phase and the node of the second user phase are connected by a transitional edge segment.

2. The system of claim 1, wherein the modeling characterization further comprises generating event-driven modeling for the authenticity identification modeling of the data stream from the authenticity requests, wherein event-driven modeling generates specific patterns in interactions based on the user profiles and misappropriation profiles for events, wherein the specific patterns are learned logical time sequence interactions identified for the event.

3. The system of claim 1, wherein the modeling characterization further comprises generating intent-driven modeling for the authenticity identification modeling of the data stream from the authenticity requests, wherein intent-driven modeling generates a dual path analysis for predicted patterning for normal authenticity requests and normal misappropriation authenticity requests, wherein a sequence of user interactions are matched to patterns of the normal authenticity requests and normal misappropriation authenticity requests to identify a sequence of patterns for intent based explanations of the authenticity request.

4. The system of claim 1, wherein the modeling characterization further comprises generating temporal based modeling for the authenticity identification modeling of the data stream from the authenticity requests, wherein temporal based modeling generates a timed pattern identification of behavior of the user.

5. The system of claim 1, wherein the modeling characterization further comprises generating a hybrid based authenticity identification utilizing a hybrid combination of temporal based modeling, event based modeling, intent based modeling, and personality based modeling for authenticity identification of the user.

6. The system of claim 1, wherein the user profile comprises the user event history, wherein the user event history is phased into temporal regions identified based on pattern recognition of the user event history, and wherein the transitional edge segments are based on associated probabilities of connections between user phase changes associated with the nodes.

7. The system of claim 1, wherein the modeling characterization is further for generation of misappropriation profiles, and wherein the computer-readable program code is further executable to optimize the user profiles, the misappropriation profiles, and authenticity models into dynamically positioned nodes within a hierarchy that are assigned, swapped, merged, separated, consolidated, or moved within the hierarchy by the controller in real-time for authenticity identification of the user, wherein the optimizing is a self-organizing hierarchical architecture.

8. The system of claim 1,
wherein a pattern comprises a merchant, geographic location, and trend in user events within a timeframe.

9. The system of claim 1, wherein streaming the data from the authenticity request through the modeling further comprises:
identifying user clusters based on user declaration or system analytics and generating a hierarchical learning profile optimization for the user;
identifying the authenticity request being initiated as an anomaly for the user;
reviewing the user hierarchical clusters to compare the anomaly for the user to individuals within the clusters; and
identifying a degree of separation of cluster members with anomaly as normal resource distribution pattern.

10. A system for real-time authenticity identification of a user, the system comprising:
a controller for dynamically hierarchical modeling characterization, the controller comprising one or more memory devices with computer-readable program code stored thereon, one or more communication devices connected to a network, and one or more processing devices, wherein the one or more processing devices are configured to execute the computer-readable program code to:
generate one or more authenticity identification procedures, wherein the authenticity identification procedures comprise authenticity modeling characterization for generation of user profiles for misappropriation, and wherein the modeling characterization comprises:
identifying user patterns with respect to a user event history,
identifying one or more transitions between user patterns, and
clustering the user patterns into nodes with transitional edge segments comprising one or more transitions connecting the nodes, wherein each node represents a user phase;
organize the authenticity models for entities, segments, groups, and the user;
interconnect the authenticity models through a dynamically adjustable structural system;
optimize the authenticity models into dynamically positioned nodes within a hierarchy that are assigned, swapped, merged, separated, consolidated, or moved within the hierarchy by the controller in real-time for authenticity identification of the user, wherein the optimizing is a self-organizing hierarchical architecture;
determine that data from an authenticity request indicates that the authenticity request is associated with a first user phase;
determine that a previous authenticity request is associated with a second user phase; and
determine whether the node of the first user phase and the node of the second user phase are connected by a transitional edge segment.

11. The system of claim 10, further comprising generating event-driven modeling, wherein event-driven modeling generates specific patterns in interactions based on the user profiles and misappropriation profiles for events, wherein the specific patterns are learned logical time sequence interactions identified for the event.

12. The system of claim 10, further comprising generating intent-driven modeling, wherein intent-driven modeling generates a dual path analysis for predicted patterning for normal authenticity requests and normal misappropriation authenticity requests, wherein a sequence of user interactions are matched to patterns of the normal authenticity requests and normal misappropriation authenticity requests to identify a sequence of patterns for intent based explanations of the authenticity request.

13. The system of claim 10, further comprising generating temporal based modeling, wherein temporal based modeling generates a timed pattern identification of behavior of the user.

14. The system of claim 10, further comprises generating a hybrid based authenticity identification utilizing a hybrid combination of temporal based modeling, event based modeling, intent based modeling, and personality based modeling for authenticity identification of the user.

15. The system of claim 10, wherein the user profile comprises the user event history, wherein the user event history is phased into temporal regions identified based on pattern recognition of the user event history, and wherein the transitional edge segments are based on associated probabilities of connections between user phase changes associated with the nodes.

16. The system of claim 10, wherein the one or more authenticity identification procedures comprise a hybrid network of one or more learning network engines, each of the one or more learning network engines configured for monitoring a misappropriation profile or a user event profile for the authenticity request for consolidated results of normal or abnormal authenticity of the user.

17. The system of claim 10,
wherein a pattern comprises a merchant, geographic location, and trend in user events within a timeframe.

18. The system of claim 10, wherein dynamically hierarchical modeling characterization further comprises:
identifying user clusters based on user declaration or system analytics and generating a hierarchical learning profile optimization for the user;
identifying the authenticity request as an anomaly for the user;
reviewing the user hierarchical clusters to compare the anomaly for the user to individuals within the clusters; and
identifying a degree of separation of cluster members with anomaly as normal resource distribution pattern.

19. A computer-implemented method for real-time authenticity identification of a user, the method comprising:
providing a controller comprising a computer processing device and a non-transitory computer readable medium, where the computer readable medium comprises configured computer program instruction code, such that when said instruction code is operated by said computer processing device, said computer processing device performs the following operations:
generate one or more authenticity identification procedures, wherein the authenticity identification procedures comprise modeling characterization for generation of user profiles for misappropriation, and wherein the modeling characterization comprises:
identifying user patterns with respect to a user event history,
identifying one or more transitions between the user patterns, and
clustering the user patterns into nodes with transitional edge segments comprising one or more transitions connecting the nodes, wherein each node represents a user phase;
identify an authenticity request as being initiated, wherein the authenticity request is for authentication, identification, or access to a secure application;
stream data from the authenticity request through the modeling of the one or more authenticity identification procedures for authenticity identification, wherein streaming the data from the authenticity request through the modeling comprises:
determining that the data from the authenticity request indicates that the authenticity request is associated with a first user phase,
determining that a previous authenticity request is associated with a second user phase, and
determining whether the node of the first user phase and the node of the second user phase are connected by a transitional edge segment; and
determine an outcome of the authenticity request based on an outcome of the authenticity identification modeling, wherein the authenticity identification modeling outcome is at least partially based on whether the node of the first user phase and the node of the second user phase are connected by a transitional edge segment.

20. The computer-implemented method of claim 19, wherein the modeling characterization further comprises generating event-driven modeling for the authenticity identification modeling of the data stream from the authenticity requests, wherein event-driven modeling generates specific patterns in interactions based on the user profiles and misappropriation profiles for events, wherein the specific patterns are learned logical time sequence interactions identified for the event.

21. The computer-implemented method of claim 19, wherein the modeling characterization further comprises generating intent-driven modeling for authenticity identification modeling of the data stream from the authenticity requests, wherein intent-driven modeling generates a dual path analysis for predicted patterning for normal authenticity requests and normal misappropriation authenticity requests, wherein a sequence of user interactions are matched to patterns of the normal authenticity requests and normal misappropriation authenticity requests to identify a sequence of patterns for intent based explanations of the authenticity request.

22. The computer-implemented method of claim 19, wherein the modeling characterization further comprises generating temporal based modeling for the authenticity identification modeling of the data stream from the authenticity requests, wherein temporal based modeling generates a timed pattern identification of behavior of the user.

23. The computer-implemented method of claim 19, wherein the modeling characterization further comprises generating a hybrid based authenticity identification utilizing a hybrid combination of temporal based modeling, event based modeling, intent based modeling, and personality based modeling for authenticity identification of the user.

* * * * *